(12) United States Patent
Xie

(10) Patent No.: US 10,552,210 B2
(45) Date of Patent: Feb. 4, 2020

(54) METHOD AND APPARATUS FOR MIGRATING VIRTUAL MACHINE

(71) Applicant: BEIJING BAIDU NETCOM SCIENCE AND TECHNOLOGY CO., LTD., Beijing (CN)

(72) Inventor: Yongji Xie, Beijing (CN)

(73) Assignee: BEIJING BAIDU NETCOM SCIENCE AND TECHNOLOGY CO., LTD., Beijing (CN)

(*) Notice: Subject to any disclaimer, the term of this patent is extended or adjusted under 35 U.S.C. 154(b) by 0 days.

(21) Appl. No.: 16/134,191

(22) Filed: Sep. 18, 2018

(65) Prior Publication Data

US 2019/0138349 A1    May 9, 2019

(30) Foreign Application Priority Data

Nov. 9, 2017  (CN) .......................... 2017 1 1108565

(51) Int. Cl.
| | |
|---|---|
| G06F 9/455 | (2018.01) |
| G06F 9/48 | (2006.01) |
| G06F 9/445 | (2018.01) |
| G06F 9/4401 | (2018.01) |
| G06F 9/54 | (2006.01) |
| G06F 11/07 | (2006.01) |

(52) U.S. Cl.
CPC ............ *G06F 9/4856* (2013.01); *G06F 9/442* (2013.01); *G06F 9/445* (2013.01); *G06F 9/4406* (2013.01); *G06F 9/45558* (2013.01); *G06F 9/4881* (2013.01); *G06F 9/542* (2013.01); *G06F 9/544* (2013.01); *G06F 9/545* (2013.01); *G06F 11/0757* (2013.01); *G06F 2009/4557* (2013.01); *G06F 2201/81* (2013.01)

(58) Field of Classification Search
CPC ....... G06F 9/45558; G06F 2009/45575; G06F 9/45533; G06F 9/4856; G06F 9/442
See application file for complete search history.

(56) References Cited

U.S. PATENT DOCUMENTS

| | | | | |
|---|---|---|---|---|
| 2005/0114645 | A1* | 5/2005 | Zimmer | G06F 9/4418 713/100 |
| 2008/0189468 | A1* | 8/2008 | Schmidt | G06F 11/203 711/6 |
| 2009/0150463 | A1* | 6/2009 | Sekiguchi | G06F 9/44505 |
| 2011/0035618 | A1* | 2/2011 | Jann | G06F 11/0712 714/3 |

(Continued)

*Primary Examiner* — Dong U Kim
(74) *Attorney, Agent, or Firm* — Knobbe, Martens, Olson & Bear, LLP

(57) ABSTRACT

Embodiments of the disclosure disclose a method and apparatus for migrating a virtual machine. A specific embodiment of the method comprises: loading a target kernel module of a target operating system, the target operating system used for controlling a target electronic device running a virtual machine, and the target kernel module used for performing a shutdown operation for the target electronic device; determining whether to perform the shutdown operation based on electronic device running state information of the target electronic device; determining whether to migrate the virtual machine when a preset triggering condition is met, in response to determining not to perform the shutdown operation; and migrating the virtual machine if determining to migrate the virtual machine.

16 Claims, 6 Drawing Sheets

(56) References Cited

U.S. PATENT DOCUMENTS

| | | | |
|---|---|---|---|
| 2011/0246986 A1* | 10/2011 | Nicholas | G06F 11/0712 |
| | | | 718/1 |
| 2013/0275973 A1* | 10/2013 | Greenfield | G06F 9/44584 |
| | | | 718/1 |
| 2013/0326168 A1* | 12/2013 | Chang | G06F 9/485 |
| | | | 711/160 |
| 2016/0283281 A1* | 9/2016 | Antony | G06F 9/5055 |
| 2018/0165101 A1* | 6/2018 | Bulusu | G06F 9/4403 |
| 2018/0335816 A1* | 11/2018 | Rothman | G06F 9/4401 |

* cited by examiner

METHOD AND APPARATUS FOR MIGRATING VIRTUAL MACHINE

CROSS-REFERENCE TO RELATED APPLICATIONS

This application is related to and claims priority from Chinese Application No. 201711108565.1, filed on Nov. 9, 2017 and entitled "Method and Apparatus for Migrating Virtual Machine," the entire disclosure of which is hereby incorporated by reference.

TECHNICAL FIELD

Embodiments of the disclosure relate to the field of computer technology, specifically to the field of virtualization technology, and more specifically to a method and apparatus for migrating a virtual machine.

BACKGROUND

As the computer technology develops, services provided using computer and Internet technology are becoming more and more abundant. A logical computer, i.e., a virtual machine, can be virtualized on a physical machine (an electronic device) using virtualization technology. If the physical machine crashes, the virtual machine running on the physical machine may be shut down.

Existing methods for migrating the virtual machine generally monitor the key indicators (such as the processor utilization rate) when the physical machine is running. When one or more of these indicators exceed certain thresholds, an alarm is triggered. Then, the virtual machine is migrated to a new physical machine in a good running state using the virtual machine migration technology.

SUMMARY

Embodiments of the disclosure propose a method and apparatus for migrating a virtual machine.

In a first aspect, an embodiment of the disclosure provides a method for migrating a virtual machine. The method includes: loading a target kernel module of a target operating system, the target operating system used for controlling a target electronic device running the virtual machine, and the target kernel module used for performing a shutdown operation for the target electronic device; determining whether to perform the shutdown operation based on electronic device running state information of the target electronic device; determining whether to migrate the virtual machine when a preset triggering condition is met, in response to determining not to perform the shutdown operation; and migrating the virtual machine if determining to migrate the virtual machine.

In some embodiments, the loading a target kernel module of a target operating system includes: detecting whether a predefined abnormal event occurs in a kernel of the target operating system; and loading the target kernel module, in response to detecting the predefined abnormal event occurring.

In some embodiments, the preset triggering condition is an identifier matching an abnormal event identifier of the predefined abnormal event existing in a preset identifier set.

In some embodiments, the target electronic device includes at least two processors, the electronic device running state information includes an abnormal processor ratio, and the abnormal processor ratio is a ratio of a number of processors involved in the predefined abnormal event to a total number of processors in the target electronic device; and the determining whether to perform the shutdown operation based on electronic device running state information of the target electronic device includes: determining whether the abnormal processor ratio is greater than a preset ratio threshold; and determining to perform the shutdown operation, in response to determining the abnormal processor ratio being greater than the preset ratio threshold.

In some embodiments, the determining whether to migrate the virtual machine includes: determining whether a processor running the virtual machine is a processor involved in the predefined abnormal event; and determining not to migrate the virtual machine, in response to determining the processor running the virtual machine being the processor involved in the predefined abnormal event.

In some embodiments, the determining whether to migrate the virtual machine further includes: performing an operation prior to migration to reduce difficulty in migrating the virtual machine, in response to determining the processor running the virtual machine being not the processor involved in the predefined abnormal event.

In some embodiments, the operation prior to the migration includes at least one of: adjusting a scheduling priority of the virtual machine, or modifying information of affinity between the virtual machine and the processor running the virtual machine.

In some embodiments, the determining whether to migrate the virtual machine further includes: determining whether to migrate the virtual machine based on the running state information of the virtual machine after performing the operation prior to the migration.

In some embodiments, after the migrating the virtual machine, the method further includes: generating a migration result, in response to determining migrating the virtual machine being completed.

In some embodiments, the determining whether to migrate the virtual machine includes: concurrently performing the determining whether to migrate the virtual machine and a wait operation, wherein the wait operation includes: defining time of determining not to perform the shutdown operation as start time; determining whether a wait duration between current time and the start time is greater than a preset duration threshold; and performing the shutdown operation, in response to determining the wait duration being greater than the preset duration threshold.

In some embodiments, the wait thread or the wait thread is further used for: defining the start time as initial triggering time, in response to determining the wait duration being smaller than or equal to the preset duration threshold, and performing following determination: determining whether the migration result is generated at the triggering time; and performing the shutdown operation, in response to determining the migration result being generated; and updating the triggering time using a sum of the triggering time and a first preset duration in response to determining the migration result being not generated, and continuing performing the determination.

In some embodiments, a first kernel module, a second kernel module and a user state process communicate with each other through a shared memory, wherein the first kernel module is used for performing the determining whether to perform the shutdown operation based on electronic device running state information of the target electronic device; the second kernel module is used for performing the determining whether to migrate the virtual machine when a preset triggering condition is met, in response to determining not to perform the shutdown operation; and the user state process is used for performing the migrating the virtual machine.

In a second aspect, an embodiment of the disclosure provides an apparatus for migrating a virtual machine. The apparatus includes: a loading unit, for loading a target kernel module of a target operating system, the target operating system used for controlling a target electronic device running the virtual machine, and the target kernel module used for performing a shutdown operation for the target electronic device; a first determining unit, for determining whether to perform the shutdown operation based on electronic device running state information of the target electronic device; a second determining unit, for determining whether to migrate the virtual machine when a preset triggering condition is met, in response to determining not to perform the shutdown operation; and a migrating unit, for migrating the virtual machine in response to determining to migrate the virtual machine.

In some embodiments, the loading unit is further used for: detecting whether a predefined abnormal event occurs in a kernel of the target operating system; and loading the target kernel module, in response to detecting the predefined abnormal event occurring.

In some embodiments, the preset triggering condition is an identifier matching an abnormal event identifier of the predefined abnormal event existing in a preset identifier set.

In some embodiments, the target electronic device includes at least two processors, the electronic device running state information includes an abnormal processor ratio, and the abnormal processor ratio is a ratio of a number of processors involved in the predefined abnormal event to a total number of processors in the target electronic device; and the second determining unit is further used for: determining whether the abnormal processor ratio is greater than a preset ratio threshold; and determining to perform the shutdown operation, in response to determining the abnormal processor ratio being greater than the preset ratio threshold.

In some embodiments, the third determining unit is further used for: determining whether a processor running the virtual machine is a processor involved in the predefined abnormal event; and determining not to migrate the virtual machine, in response to determining the processor running the virtual machine being the processor involved in the predefined abnormal event.

In some embodiments, the third determining unit is further used for: performing an operation prior to migration to reduce difficulty in migrating the virtual machine, in response to determining the processor running the virtual machine being not the processor involved in the predefined abnormal event.

In some embodiments, the operation prior to the migration includes at least one of: adjusting a scheduling priority of the virtual machine, or modifying information of affinity between the virtual machine and the processor running the virtual machine.

In some embodiments, the third determining unit is further used for: determining whether to migrate the virtual machine based on the running state information of the virtual machine after performing the operation prior to the migration.

In some embodiments, the apparatus further includes a generating unit, for: generating a migration result, in response to determining the migrating the virtual machine being completed.

In some embodiments, the second determining unit is used for: concurrently performing the determining whether to migrate the virtual machine and a wait operation, wherein the wait operation includes: defining time of determining not to perform the shutdown operation as start time; determining whether a wait duration between current time and the start time is greater than a preset duration threshold; and performing the shutdown operation, in response to determining the wait duration being greater than the preset duration threshold.

In some embodiments, the wait operation further includes: defining the start time as initial triggering time, in response to determining the wait duration being smaller than or equal to the preset duration threshold, and performing following determination: determining whether the migration result is generated at the triggering time; and performing the shutdown operation, in response to determining the migration result being generated; and updating the triggering time using a sum of the triggering time and a first preset duration in response to determining the migration result being not generated, and continuing performing the determination.

In some embodiments, a first kernel module, a second kernel module and a user state process communicate with each other through a shared memory, wherein the first kernel module is used for performing the determining whether to perform the shutdown operation based on electronic device running state information of the target electronic device; the second kernel module is used for performing the determining whether to migrate the virtual machine when a preset triggering condition is met, in response to determining not to perform the shutdown operation; and the user state process is used for performing the migrating the virtual machine.

In a third aspect, an embodiment of the disclosure provides an electronic device, the electronic device including: one or more processors; and a memory for storing one or more programs, where the one or more programs, when executed by the one or more processors, cause the one or more processors to implement the method according to the first aspect.

In some embodiments, the electronic device includes a first processor and a second processor, wherein a first program implements following when executed by the first processor: determining whether to perform a shutdown operation based on electronic device running state information of the target electronic device; and informing, in response to determining not to perform the shutdown operation, the second processor by the first processor to execute a second program through internuclear interruption; the second program implements following when executed by the second processor: determining whether to migrate the virtual machine when a preset triggering condition is met; and the second processor executes a third program, in response to determining to migrate the virtual machine, and the third program implements following when executed by the second processor: migrating the virtual machine.

In a fourth aspect, an embodiment of the disclosure provides a computer readable storage medium storing a computer program therein, where the program, when executed by a processor, implements the method according to the first aspect.

The method and apparatus for migrating a virtual machine provided by an embodiment of the disclosure load a target kernel module of a target operating system, the target operating system used for controlling a target electronic device running the virtual machine, and the target kernel module used for performing a shutdown operation for the target electronic device; determine whether to perform the shutdown operation based on electronic device running state information of the target electronic device; determine whether to migrate the virtual machine when a preset triggering condition is met, in response to determining not to perform the shutdown operation; and migrate the virtual machine if determining to migrate the virtual machine, thereby enriching the method for migrating a virtual machine.

BRIEF DESCRIPTION OF THE DRAWINGS

By reading and referring to detailed description on the non-limiting embodiments in the following accompanying drawings, other features, objects and advantages of the disclosure will become more apparent.

DETAILED DESCRIPTION OF EMBODIMENTS

The present disclosure will be further described below in detail in combination with the accompanying drawings and the embodiments. It should be appreciated that the specific embodiments described herein are merely used for explaining the relevant disclosure, rather than limiting the disclosure. In addition, it should be noted that, for the ease of description, only the parts related to the relevant disclosure are shown in the accompanying drawings.

It should be noted that the embodiments in the present disclosure and the features in the embodiments may be combined with each other on a non-conflict basis. The present disclosure will be described below in detail with reference to the accompanying drawings and in combination with the embodiments.

Figure 1:
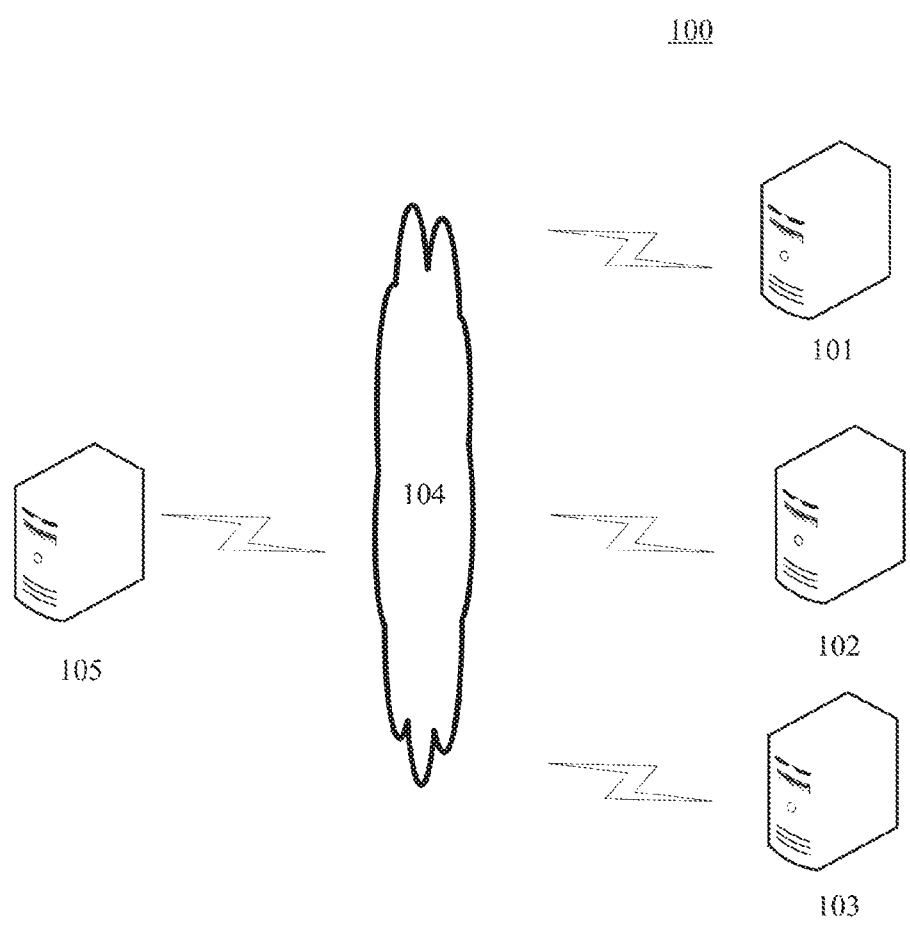
FIG. 1 is an architectural diagram of a system in which some embodiments of the present disclosure may be implemented.

FIG. 1 shows an architecture of a system 100 which may be used by a method for generating a patch or an apparatus for generating a patch according to the embodiments of the present disclosure.

As shown in FIG. 1, the system architecture 100 may include servers 101, 102 and 103, a network 104, and a server 105. The network 104 serves as a medium providing a communication link between the servers 101, 102 and 103 and the server 105. The network 104 may include various types of connections, such as wired or wireless transmission links, or optical fibers.

The servers 101, 102, 103 and 105 may be controlled by the operation system thereon. There may be virtual machines run on the servers 101, 102, 103 and 105.

The server 105 may migrate a virtual machine to the servers 101, 102 and 103. For example, the virtual machine run on the server 105 may be migrated to the servers 101, 102 or 103.

The servers 101, 102, 103 and 105 may be a server providing various services, for example, a backend server that provides support for webpages displayed on terminal devices (not shown).

It should be noted that the method for migrating a virtual machine according to the embodiments of the present disclosure is generally executed by the server 105. Accordingly, an apparatus for migrating a virtual machine is generally installed on the server 105.

It should be appreciated that the numbers of the servers, the networks, and the servers in FIG. 1 are merely illustrative. Any number of servers and networks may be provided based on the actual requirements.

Figure 2:
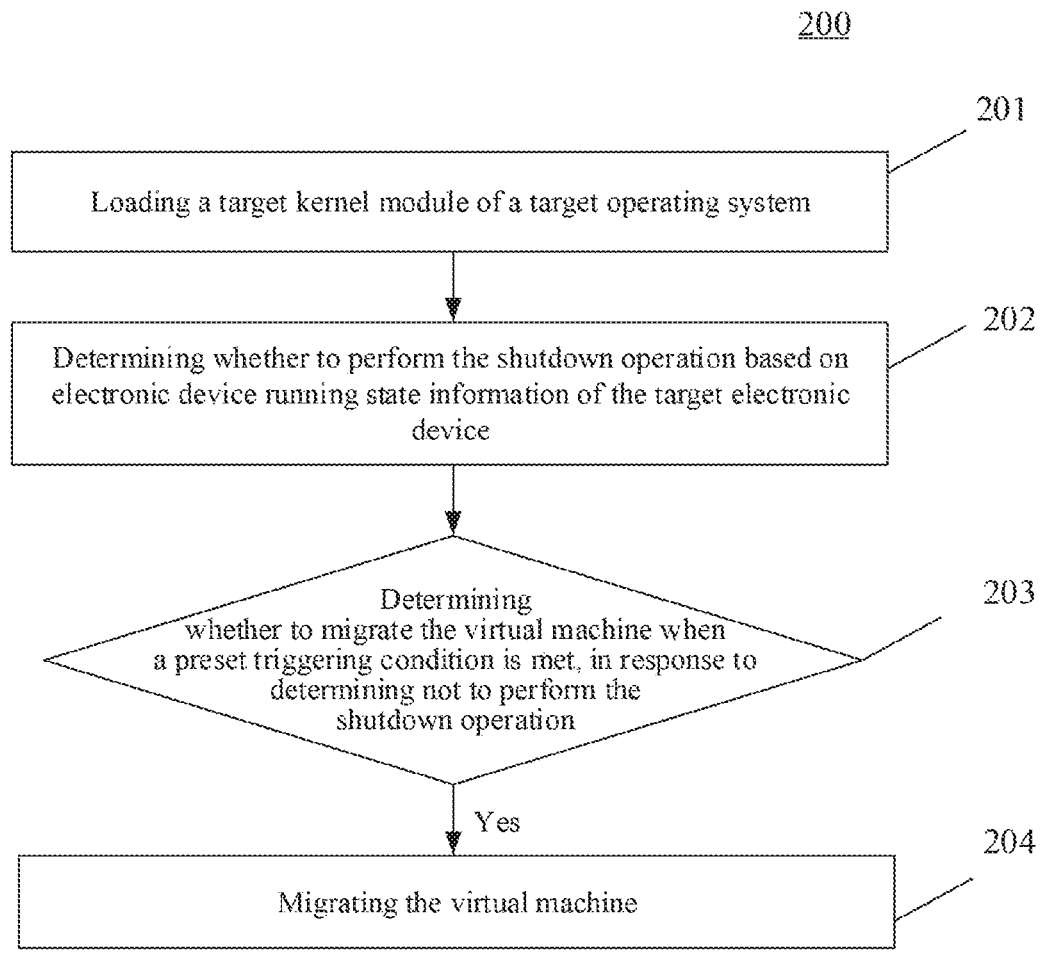
FIG. 2 is a flowchart of an embodiment of a method for migrating a virtual machine according to the disclosure.

Please further refer to FIG. 2, FIG. 2 shows a flow 200 of an embodiment of a method for migrating a virtual machine according to the disclosure. The method for migrating a virtual machine includes the following steps.

Step 201: loading a target kernel module of a target operating system.

In the embodiment, an electronic device (e.g., the server 105 shown in FIG. 1) in which the method for migrating a virtual machine is performed may load a target kernel module of a target operating system.

In the embodiment, the target operating system may be used for controlling the target electronic device running the virtual machine (VM).

In the embodiment, the operating system (OS) may be a computer program that manages and controls computer hardware and software resources, and may be the most basic system software that runs directly on a bare machine. Other software needs to be supported by the operating system to run. Here, the target operating system may be any type of operating system.

In the embodiment, the target electronic device may be an electronic device that executes steps in the embodiment.

In the embodiment, one or more virtual machines may run in the target electronic device. The virtual machine may refer to a complete computer system that runs in a completely isolated environment by software simulation with the functions of complete hardware system. Therefore, there may be an operating system controlling the target electronic device and an operating system controlling the virtual machine. It is to be distinguished that, the target operating system in the embodiment is used for controlling the target electronic device, but not the operating system for controlling the virtual machine.

It should be noted that, the virtual machine is presented in the form of a process in the target electronic device, thus the virtual machine A may also be called as a virtual machine process A.

In the embodiment, the kernel module may be codes allowing the operating system kernel to be loaded and executed when necessary, and may be uninstalled by the operating system when it is not necessary. The kernel module extends the function of the operating system kernel without the need of restarting the operating system. As an example, the kernel module may be a device-driven (for example, network device-driven) module.

In the embodiment, the operating system kernel may be the core of the operating system, and is also the most basic part of the operating system. The operating system kernel is responsible for managing the system process, memory, device drive program, file and network system, and determines the performance and stability of the system.

In the embodiment, the target kernel module may be used for performing a shutdown operation for the target electronic device, i.e., if the target electronic device loads and executes the target kernel module, then the target electronic device is shut down. As an example, the target kernel module may be a module encapsulated with a panic function.

It should be noted that, in the existing technology, if the target electronic device loads the target kernel module, then the target electronic device executes the shutdown operation. However, in the embodiment, when the target electronic device loads the target kernel module, the target electronic device does not immediately perform the shutdown operation.

In some optional implementations of the embodiment, the step 201 may include: determining whether a predefined abnormal event occurs in a kernel of the target operating system; and loading the target kernel module, in response to determining the predefined abnormal event occurring in the kernel of the target operating system.

In some optional implementations of the embodiment, the predefined abnormal event may be one or more predefined abnormal events that may occur in the kernel. As an example, the predefined abnormal event may be, but is not limited to: a kernel deadlock event, a kernel null pointer access event, or a kernel module detecting an illegal operation event.

It should be noted that the occurrences of these predefined abnormal events mean that the kernel of the target operating system may have had an irreversible error and the target operating system becomes unstable. Therefore, the target operating system may control the electronic device to load the target kernel module and perform the shutdown operation, and then attempt to restore the target operating system by restarting.

It should be noted that loading the target kernel module may occur not only in a scenario that the predefined abnormal event occurs in the kernel, but also in some other scenarios, for example, when the target electronic device is overloaded.

Step 202: determining whether to perform the shutdown operation based on electronic device running state information of the target electronic device.

In the embodiment, the electronic device may determine whether to perform the shutdown operation based on electronic device running state information of the target electronic device.

In the embodiment, the electronic device running state information may be information characterizing the running state of the electronic device.

In some optional implementations of the embodiment, the electronic device running state information may include, but is not limited to, one or more of following items: a processor utilization rate, a memory load, a disk utilization rate, or an electronic device temperature.

It should be noted that, popularly speaking, the determining whether to perform the shutdown operation based on electronic device running state information of the target electronic device may be determining whether the running state of the target electronic device is not very poor based on the electronic device running state information. If the running state of the target electronic device is not very poor, and the system does not have a risk of being paralysed, then the shutdown operation is not executed. If the running state of the target electronic device is very poor, it is very likely to fail to complete migrating the virtual machine, then the shutdown operation may be executed to avoid implementing the virtual machine migration that is unlikely to be completed.

In some optional implementations of the embodiment, the target electronic device includes at least two processors, the electronic device running state information includes an abnormal processor ratio, and the abnormal processor ratio is a ratio of a number of processors involved in the predefined abnormal event to a total number of processors in the target electronic device. Here, the step 202 may include: determining whether the abnormal processor ratio is greater than a preset ratio threshold; and determining to perform the shutdown operation, in response to determining the abnormal processor ratio being greater than the preset ratio threshold.

It should be noted that if the abnormal processor ratio is greater than the preset ratio threshold, the error source causing to load the target kernel module may have or have already had a global influence on the target operating system. At this time, most processors of the target electronic device may be or have been affected by the error source, and it may be impossible to migrate the virtual machine. Therefore, in this case, direct shutdown can avoid implementing the virtual machine migration that is unlikely to be completed.

Step 203: determining whether to migrate the virtual machine when a preset triggering condition is met, in response to determining not to perform the shutdown operation.

In the embodiment, the electronic device may determine whether to migrate the virtual machine when a preset triggering condition is met, in response to determining not to perform the shutdown operation.

In the embodiment, in practice, the preset triggering condition may be set based on the practical situation.

It should be noted that, since the determination of whether to migrate the virtual machine is triggered based on the preset triggering condition, the way of triggering to determine whether to migrate the virtual machine may be flexibly adjusted. As an example, an initial preset triggering condition may be an event A occurring in the operating system kernel. With the deepening of practice, the preset triggering condition may be modified to the event A and an event B occurring in the operating system kernel.

In some optional implementations of the embodiment, the preset triggering condition may be an identifier matching an abnormal event identifier of the predefined abnormal event existing in a preset identifier set.

As an example, the identifier set includes an identifier A and an identifier B. If the abnormal event identifier of the predefined abnormal event is the identifier A, then the preset triggering condition is met. If the abnormal event identifier of the predefined abnormal event is an identifier C, then the preset triggering condition is not met.

It should be noted that loading the target kernel module does not mean that the target operating system will soon be paralyzed. The occurrences of some predefined abnormal events do not mean that the target operating system will soon be paralyzed. Therefore, an identifier set may be set. Identifiers in the identifier set are some abnormal event identifiers that are very likely to cause the target operating system to be paralyzed. Thus, the occurrence of an abnormal event indicated by an identifier in the identifier set can be monitored, and then determining whether to migrate the virtual machine can be triggered. In this way, irreversible errors occurring in the target operating system can be more accurately determined. Finding the most appropriate timing to trigger to determine whether to migrate the virtual machine can avoid improper migration or fail to migrate in time.

In some optional implementations of the embodiment, the preset triggering condition may also be unconditional. Specifically, the preset triggering condition may be set as determining not to perform the shutdown operation, i.e., directly triggering to determine whether to migrate the virtual machine, in response to determining not to perform the shutdown operation.

In the embodiment, the determining whether to migrate the virtual machine may be implemented in various ways.

In some optional implementations of the embodiment, the determining whether to migrate the virtual machine may be implemented by following: determining whether a processor running the virtual machine is the processor involved in the predefined abnormal event; determining not to migrate the virtual machine, in response to determining the processor running the virtual machine being the processor involved in the predefined abnormal event; and determining to migrate the virtual machine, in response to determining the processor running the virtual machine being not the processor involved in the predefined abnormal event.

Optionally, the processor involved in the predefined abnormal event may be a processor the processing and running of which is affected by the occurrence of the predefined abnormal event, or a processor in which the predefined abnormal event occurs. As an example, when a kernel deadlock event occurs in a kernel, two deadlocked processors and a process running thereon may be unable to work, but other CPUs are still running normally. The two deadlocked processors are the processors involved in the predefined abnormal event.

In some optional implementations of the embodiment, the determining whether to migrate the virtual machine may be implemented by following: determining whether to migrate the virtual machine based on running state information of the virtual machine.

Optionally, the running state information of the virtual machine may be information characterizing the running state of the virtual machine. The running state information of the virtual machine may include static information and dynamic information. As an example, the static information may include, but is not limited to, at least one of following items: a memory capacity of the virtual machine, a CPU count of the virtual machine, an operating system type or a storage network device type. The dynamic information may include, but is not limited to, at least one of following items: a processor utilization rate, a memory load, or a disk utilization rate.

As an example, if the memory capacity of the virtual machine is greater than a preset capacity threshold, then the virtual machine is not migrated.

Figure 3:
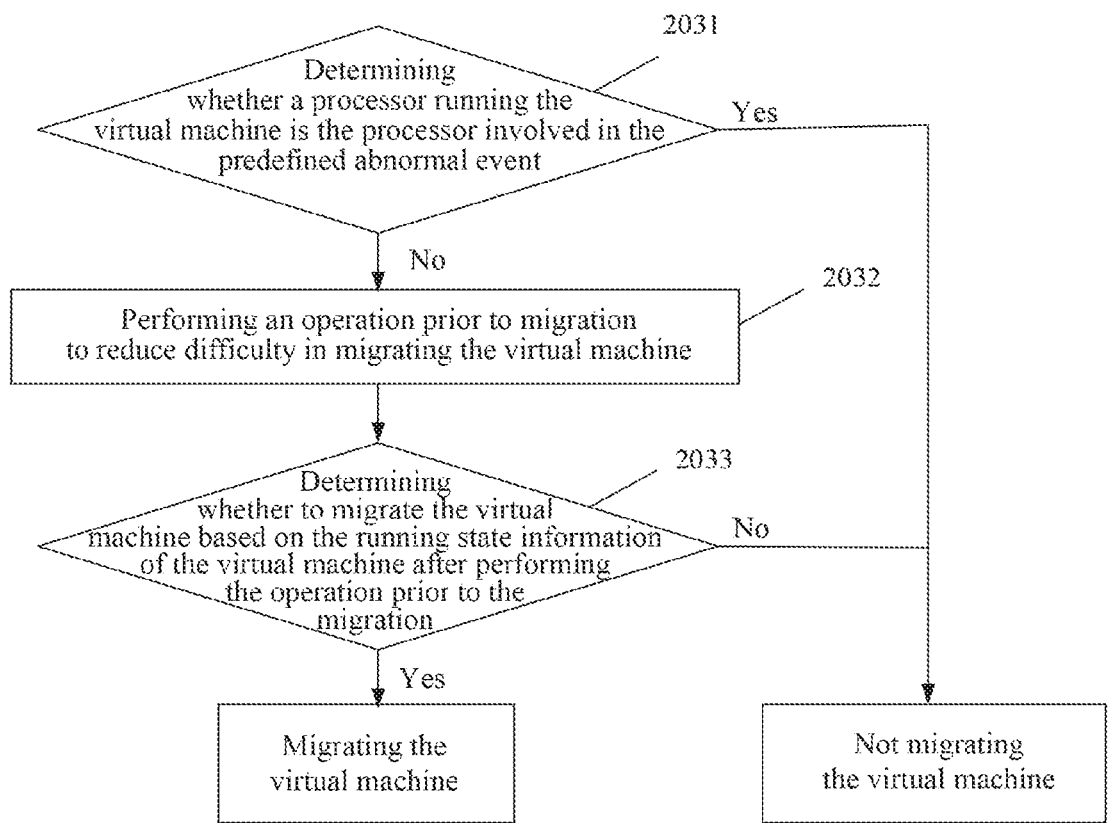
FIG. 3 is a flowchart of an implementation of step 203 according to some embodiments.

In some optional implementations of the embodiment, the determining whether to migrate the virtual machine may also be implemented through a flow 203 shown in FIG. 3. The flow 203 includes the following steps.

Step 2031: determining whether a processor running the virtual machine is the processor involved in the predefined abnormal event.

step 2032: performing an operation prior to migration to reduce difficulty in migrating the virtual machine, in response to determining the processor running the virtual machine being not the processor involved in the predefined abnormal event.

Optionally, the operation prior to the migration includes at least one of following items: adjusting a scheduling priority of the virtual machine, or modifying information of affinity between the virtual machine and the processor running the virtual machine.

As an example, the scheduling priority may be information characterizing priorities of schedules set by the target electronic device. For example, three virtual machines, i.e., a virtual machine A, a virtual machine B, and a virtual machine C, may be running on the target electronic device. If determining the processor running the virtual machine A being not the processor involved in the predefined abnormal event, then the scheduling priority of the virtual machine is improved, to guarantee that migrating the virtual machine A can be completed as soon as possible.

As an example, the affinity information may be information characterizing a binding relationship between the virtual machine and the processor running the virtual machine. For example, if the affinity information indicates the virtual machine A and the processor A having a binding relationship, then the virtual machine A can not be migrated from the processor A. It should be noted that, the binding relationship may be binary, for example, binding and non-binding; and may also be polynary, such as strong binding, weak binding and non-binding.

Step 2033: determining whether to migrate the virtual machine based on the running state information of the virtual machine after performing the operation prior to the migration.

It should be noted that the running state information of the virtual machine may also include the affinity information and the scheduling priority information. After performing the operation prior to the migration, the running state information of the virtual machine is very likely to have changed. The determining whether to migrate the virtual machine using the running state information of the virtual machine can more accurately predict the success rate of migrating the virtual machine, thereby more accurately determining whether to migrate the virtual machine.

Step 204: migrating the virtual machine if determining to migrate the virtual machine.

In the embodiment, the electronic device may migrate the virtual machine when determining to migrate the virtual machine in the step 203.

Here, the virtual machine may be migrated from the target electronic device to another electronic device rather than the target electronic device.

It should be noted that, the virtual machine can be migrated in time before the electronic device running the virtual machine is shut down using the method illustrated in the embodiment of the disclosure. Thus, the virtual machine may not be shut down or its running may not be affected because of the shutdown of the electronic device.

It should be noted that, with the development of virtual machine technology, the system migration is more flexible and diversified. The migration of the virtual machine can be implemented using a variety of migration methods. After determining to migrate the virtual machine, how to implement the migrating the virtual machine can be implemented by a person skilled in the art.

As an example, the migrating the virtual machine may be as follows: establishing a communication connection between the target electronic device and a receiving electronic device; transmitting configuration information and device information of the virtual machine by the target electronic device to the receiving electronic device; transmitting the virtual machine memory by the target electronic device to the receiving electronic device; suspending the virtual machine, transmitting current state information of the virtual machine by the target electronic device; and restoring the virtual machine by the receiving electronic device.

In some optional implementations of the embodiment, after the migrating the virtual machine, the method further includes: generating a migration result, in response to determining migrating the virtual machine being completed.

In some optional implementations of the embodiment, the step 203 of the embodiment may include concurrently performing the determining whether to migrate the virtual machine and a wait operation, wherein the wait operation includes: defining time of determining not to perform the shutdown operation as start time; determining whether a wait duration between current time and the start time is greater than a preset duration threshold; and performing the shutdown operation, in response to determining the wait duration being greater than the preset duration threshold.

It should be noted that, if the wait operation and the process produced in determining whether to migrate the virtual machine when a preset triggering condition is met are on the same processor, then a new thread is established. If the wait operation and the process produced in determining whether to migrate the virtual machine when a preset triggering condition is met are on different processors, then a new process is established.

The wait operation further includes: defining the start time as initial triggering time, in response to determining the wait duration being smaller than or equal to the preset duration threshold, and performing following: determining whether a migration result is generated at the triggering time; and performing the shutdown operation, in response to determining the migration result being generated; and updating the triggering time using a sum of the triggering time and a first preset duration in response to determining the migration result being not generated, and continuing performing the determining.

It should be noted that, after determining not to perform the shutdown operation, the migrating the virtual machine may be or may not be performed. The target electronic device may establish and execute the wait process or the wait thread. If the migration result is generated within a preset period, then it is indicated that the virtual machine is migrated successfully. In this case, immediately performing the shutdown operation may not only not affect the virtual machine running, but also restore the target operating system. If the migration result is not generated within the preset period, then the virtual machine may not be migrated since the beginning or not be migrated successfully. In this case, continuing waiting without shutdown may cause the operating system to be more unstable, and may further cause the target operating system and even the target electronic device to have irreversible damages. Therefore, if the migration result is not generated within the preset period, then the shutdown operation is performed to avoid irreversible errors of the target operating system in time.

In some optional implementations of the embodiment, interprocess communication of the electronic device may be implemented through a shared memory. Optionally, a first kernel module, a second kernel module and a user state process communicate with each other through the shared memory. The first kernel module is used for performing the determining whether to perform the shutdown operation based on electronic device running state information of the target electronic device. The second kernel module is used for performing the determining whether to migrate the virtual machine when a preset triggering condition is met, in response to determining not to perform the shutdown operation; and the user state process is used for performing the migrating the virtual machine.

Optionally, the first kernel module and the second kernel module may run in a kernel state, and the user state process may be a process in the user state.

It should be noted that the communication efficiency can be improved by implementing the interprocess communication using the shared memory.

It should be noted that existing technologies often monitor the key indicators (such as the processor utilization rate) when the physical machine is running. When one or more of these indicators exceed certain thresholds, an alarm may be triggered. Then, the virtual machine is migrated to a new physical machine in a good running state using the virtual machine migration technology. The method of the existing technologies can guarantee that the virtual machine is not running on a physical machine having a shutdown risk to some extent, but cannot practically detect the occurrence of the physical machine shutdown, and is just an early warning mechanism. Therefore, it is inevitable to cause two scenarios. One scenario: the physical machine is shut down when the indicators do not reach the thresholds. In this case, the early warning mechanism fails, and the virtual machine is shut down, which will still affect the virtual machine running. The other scenario: the physical machine load is too high for a certain period to reach the threshold warning condition, but it does not trigger the physical machine shutdown, migrating the virtual machine will consume physical resources and network bandwidth in vain.

In contrast, in the embodiment of the disclosure, preparations for migrating the virtual machine are made to migrate the virtual machine in the determined scenario of loading the target kernel module for performing the shutdown operation. Therefore, the method illustrated in the embodiment of the disclosure accurately detects the impending fact of shutdown from the source, then migrates a user's virtual machine using the migration technology, can migrate the virtual machine in time before the physical machine is shut down to guarantee high availability of the virtual machine, and avoid meaningless migration.

The method provided by the above embodiments of the disclosure loads a target kernel module of a target operating system, the target operating system used for controlling a target electronic device running a virtual machine, and the target kernel module used for performing a shutdown operation for the target electronic device; determines whether to perform the shutdown operation based on electronic device running state information of the target electronic device; determines whether to migrate the virtual machine when a preset triggering condition is met, in response to determining not to perform the shutdown operation; and migrates the virtual machine if determining to migrate the virtual machine, thereby enriching the method for migrating a virtual machine.

Figure 4:
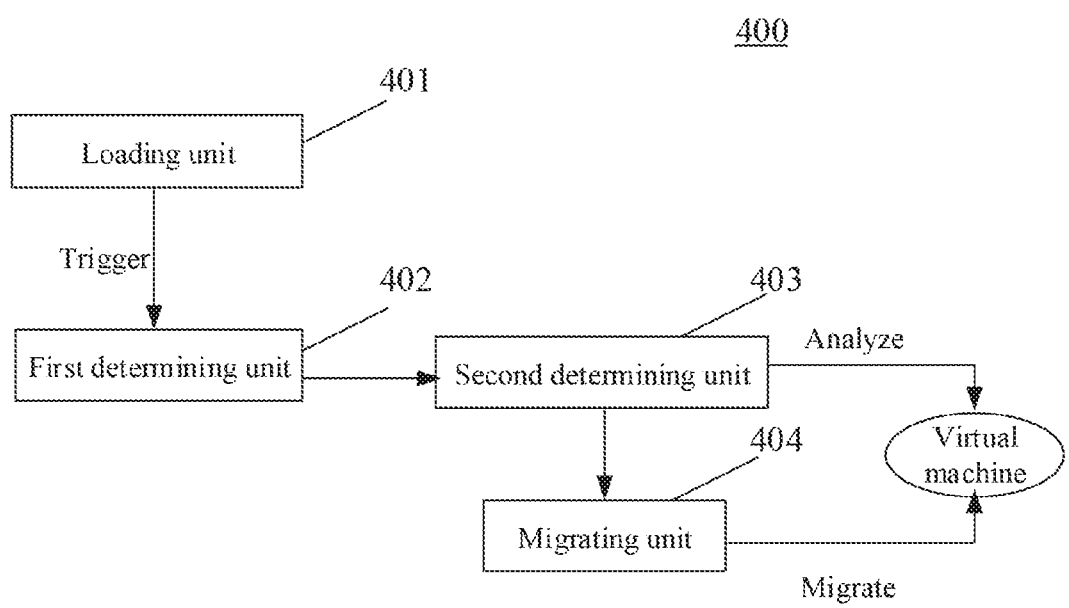
FIG. 4 is a structural schematic diagram of an embodiment of an apparatus for migrating a virtual machine according to the disclosure.

Please further refer to FIG. 4. As an implementation of the method shown in the above figures, the disclosure provides an embodiment of an apparatus for migrating a virtual machine. The embodiment of the apparatus corresponds to the embodiment of the method shown in FIG. 2, and the apparatus may be specifically applied to a variety of electronic devices.

As shown in FIG. 4, the apparatus 400 for migrating a virtual machine according to the embodiment includes: a loading unit 401, a first determining unit 402, a second determining unit 403 and a migrating unit 404. The loading unit is used for loading a target kernel module of a target operating system, wherein the target operating system is used for controlling a target electronic device running the virtual machine, and the target kernel module is used for performing a shutdown operation for the target electronic device; the first determining unit is used for determining whether to perform the shutdown operation based on electronic device running state information of the target electronic device; the second determining unit is used for determining whether to migrate the virtual machine when a preset triggering condition is met, in response to determining not to perform the shutdown operation; and the migrating unit is used for migrating the virtual machine in response to determining to migrate the virtual machine.

As shown in FIG. 4, the loading unit may trigger the first determining unit, and the second determining unit may determine whether to migrate the virtual machine by analyzing the virtual machine. The migrating unit can migrate the virtual machine.

Relevant descriptions on the steps 201, 202, 203 and 204 in the embodiment corresponding to FIG. 2 may be respectively referred to for specific processing of the loading unit 401, the first determining unit 402, the second determining unit 403 and the migrating unit 404 according to the embodiment and technical effects brought thereby, which are not repeated any more here.

In some optional implementations of the embodiment, the loading unit is further used for: detecting whether a predefined abnormal event occurs in a kernel of the target operating system; and loading the target kernel module, in response to detecting the predefined abnormal event occurring.

In some optional implementations of the embodiment, the preset triggering condition is an identifier matching an abnormal event identifier of the predefined abnormal event existing in a preset identifier set.

In some optional implementations of the embodiment, the target electronic device includes at least two processors, the electronic device running state information includes an abnormal processor ratio, and the abnormal processor ratio is a ratio of a number of processors involved in the predefined abnormal event to a total number of processors in the target electronic device; and the second determining unit is further used for: determining whether the abnormal processor ratio is greater than a preset ratio threshold; and determining to perform the shutdown operation, in response to determining the abnormal processor ratio being greater than the preset ratio threshold.

In some optional implementations of the embodiment, the third determining unit is further used for: determining whether a processor running the virtual machine is a processor involved in the predefined abnormal event; and determining not to migrate the virtual machine, in response to determining the processor running the virtual machine being the processor involved in the predefined abnormal event.

In some optional implementations of the embodiment, the third determining unit is further used for: performing an operation prior to migration to reduce difficulty in migrating the virtual machine, in response to determining the processor running the virtual machine being not the processor involved in the predefined abnormal event.

In some optional implementations of the embodiment, the operation prior to the migration includes at least one of: adjusting a scheduling priority of the virtual machine, or modifying information of affinity between the virtual machine and the processor running the virtual machine.

In some optional implementations of the embodiment, the third determining unit is further used for: determining whether to migrate the virtual machine based on the running state information of the virtual machine after performing the operation prior to the migration.

In some optional implementations of the embodiment, the apparatus further includes a generating unit (not shown), for: generating a migration result, in response to determining the migrating the virtual machine being completed.

In some optional implementations of the embodiment, the second determining unit is used for: concurrently performing the determining whether to migrate the virtual machine and a wait operation, wherein the wait operation includes: defining time of determining not to perform the shutdown operation as start time; determining whether a wait duration between current time and the start time is greater than a preset duration threshold; and performing the shutdown operation, in response to determining the wait duration being greater than the preset duration threshold.

In some optional implementations of the embodiment, the wait operation further includes: defining the start time as initial triggering time, in response to determining the wait duration being smaller than or equal to the preset duration threshold, and performing following determination: determining whether the migration result is generated at the triggering time; and performing the shutdown operation, in response to determining the migration result being generated; and updating the triggering time using a sum of the triggering time and a first preset duration in response to determining the migration result being not generated, and continuing performing the determination.

In some optional implementations of the embodiment, a first kernel module, a second kernel module and a user state process communicate with each other through a shared memory, wherein the first kernel module is used for performing the determining whether to perform the shutdown operation based on electronic device running state information of the target electronic device; the second kernel module is used for performing the determining whether to migrate the virtual machine when a preset triggering condition is met, in response to determining not to perform the shutdown operation; and the user state process is used for performing the migrating the virtual machine.

It should be noted that the descriptions of other embodiments in the disclosure may be referred to for the implementation details and technical effects of the units in the apparatus for migrating a virtual machine according to the embodiment, which are not repeatedly described any more here.

Figure 5A:
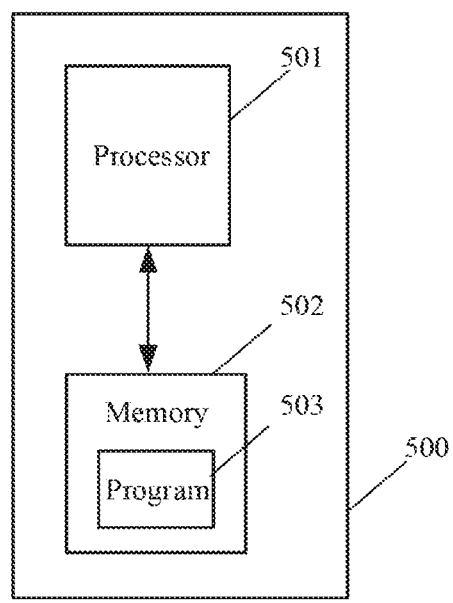
FIG. 5A is a structural schematic diagram of an embodiment of an electronic device according to the disclosure.

The disclosure provides an embodiment of an electronic device. As shown in FIG. 5A, the electronic device 500 may include: one or more processors 501; and a memory 502 for storing one or more programs 503, where the one or more programs, when executed by the one or more processors, cause the one or more processors to implement the method as shown in the embodiment corresponding to FIG. 2.

Figure 5B:
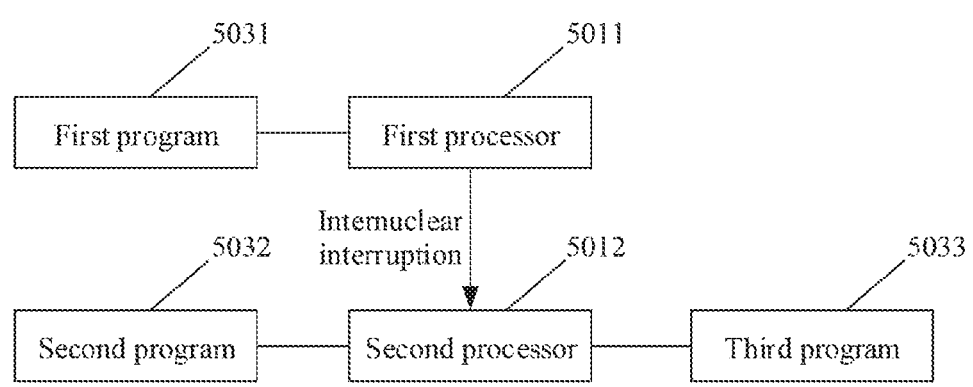
FIG. 5B is a structural schematic diagram of an implementation of an embodiment corresponding to FIG. 5A.

In some optional implementations of the embodiment, as shown in FIG. 5B, the electronic device includes a first processor 5011 and a second processor 5012, wherein a first program 5031 implements following when executed by the first processor: determining whether to execute a shutdown operation based on electronic device running state information of the target electronic device; and informing, in response to determining not to perform the shutdown operation, the second processor by the first processor to execute a second program 5032 through internuclear interruption; the second program implements following when executed by the second processor: determining whether to migrate the virtual machine when a preset triggering condition is met; and the second processor executes a third program 5033, in response to determining to migrate the virtual machine, and the third program implements following when executed by the second processor: migrating the virtual machine.

It should be noted that the first processor informs the second processor to execute the second program through internuclear interruption, and when the second program is executed by the second processor, the process of the second program may be in an interruption context in consequence. Thus, the second processor can efficiently execute the second program without being interrupted by other processes or external interrupts.

It should be noted that, after determining to migrate the virtual machine, the second processing unit executes the third program directly on the processor, to implement the migrating the virtual machine. The existing technologies inform a random processor to execute virtual machine operations. Compared with the existing technologies, the method according to the embodiment can start to migrate the virtual machine as soon as possible.

Figure 6:
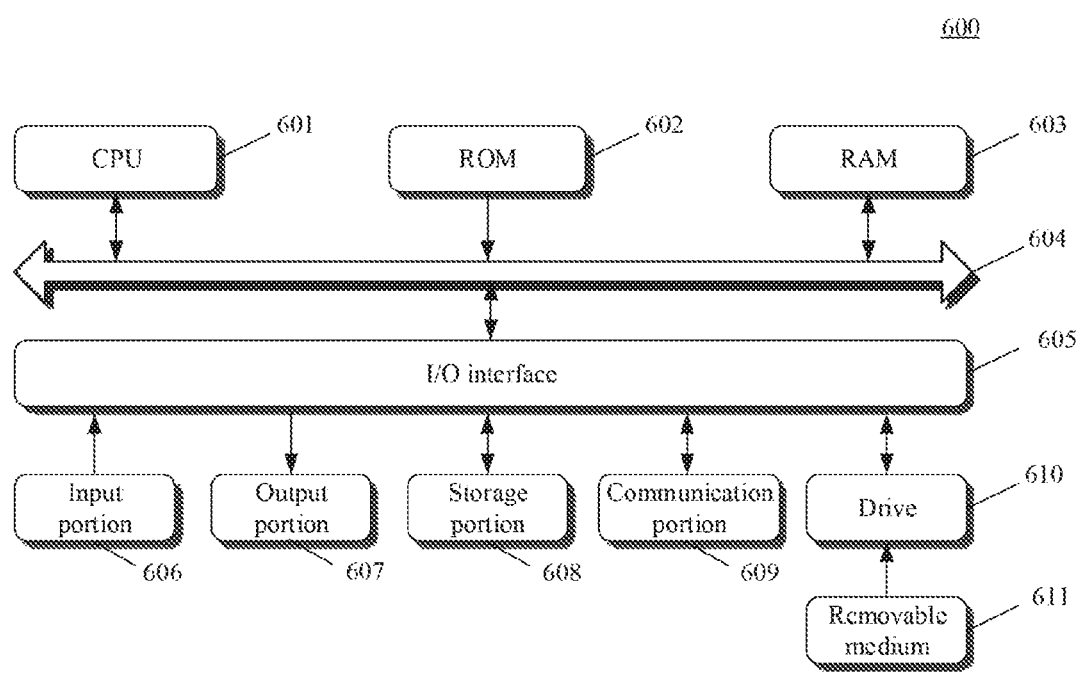
FIG. 6 is a structural schematic diagram of a computer system adapted to implement a server according to an embodiment of the disclosure.

Referring to FIG. 6, a schematic structural diagram of a computer system 600 adapted to implement a server of the embodiments of the present disclosure is shown. The server shown in FIG. 6 is merely an example, and should not bring any limitations to the functions and the scope of use of the embodiments of the present disclosure.

As shown in FIG. 6, the computer system 600 includes a central processing unit (CPU) 601, which may execute various appropriate actions and processes in accordance with a program stored in a read-only memory (ROM) 602 or a program loaded into a random access memory (RAM) 603 from a storage portion 608. The RAM 603 also stores various programs and data required by operations of the system 600. The CPU 601, the ROM 602 and the RAM 603 are connected to each other through a bus 604. An input/output (I/O) interface 605 is also connected to the bus 604.

The following components are connected to the I/O interface 605: an input portion 606 including a keyboard, a mouse etc.; an output portion 607 comprising a cathode ray tube (CRT), a liquid crystal display device (LCD), a speaker etc.; a storage portion 608 including a hard disk and the like; and a communication portion 609 comprising a network interface card, such as a LAN card and a modem. The communication portion 609 performs communication processes via a network, such as the Internet. A driver 610 is also connected to the I/O interface 605 as required. A removable medium 611, such as a magnetic disk, an optical disk, a magneto-optical disk, and a semiconductor memory, may be installed on the driver 610, to facilitate the retrieval of a computer program from the removable medium 611, and the installation thereof on the storage portion 608 as needed.

In particular, according to embodiments of the present disclosure, the process described above with reference to the flow chart may be implemented in a computer software program. For example, an embodiment of the present disclosure includes a computer program product, which comprises a computer program that is tangibly embedded in a machine-readable medium. The computer program comprises program codes for executing the method as illustrated in the flow chart. In such an embodiment, the computer program may be downloaded and installed from a network via the communication portion 609, and/or may be installed from the removable media 611. The computer program, when executed by the central processing unit (CPU) 601, implements the above mentioned functionalities as defined by the methods of some embodiments of the present disclosure.

It should be noted that the computer readable medium in some embodiments of the present disclosure may be computer readable signal medium or computer readable storage medium or any combination of the above two. An example of the computer readable storage medium may include, but not limited to: electric, magnetic, optical, electromagnetic, infrared, or semiconductor systems, apparatus, elements, or a combination any of the above. A more specific example of the computer readable storage medium may include but is not limited to: electrical connection with one or more wire, a portable computer disk, a hard disk, a random access memory (RAM), a read only memory (ROM), an erasable programmable read only memory (EPROM or flash memory), a fibre, a portable compact disk read only memory (CD-ROM), an optical memory, a magnet memory or any suitable combination of the above. In some embodiments of the present disclosure, the computer readable storage medium may be any physical medium containing or storing programs which can be used by a command execution system, apparatus or element or incorporated thereto. In some embodiments of the present disclosure, the computer readable signal medium may include data signal in the base band or propagating as parts of a carrier, in which computer readable program codes are carried. The propagating signal may take various forms, including but not limited to: an electromagnetic signal, an optical signal or any suitable combination of the above. The signal medium that can be read by computer may be any computer readable medium except for the computer readable storage medium. The computer readable medium is capable of transmitting, propagating or transferring programs for use by, or used in combination with, a command execution system, apparatus or element. The program codes contained on the computer readable medium may be transmitted with any suitable medium including but not limited to: wireless, wired, optical cable, RF medium etc., or any suitable combination of the above.

The flow charts and block diagrams in the accompanying drawings illustrate architectures, functions and operations that may be implemented according to the systems, methods and computer program products of the various embodiments of the present disclosure. In this regard, each of the blocks in the flow charts or block diagrams may represent a module, a program segment, or a code portion, said module, program segment, or code portion comprising one or more executable instructions for implementing specified logic functions. It should also be noted that, in some alternative implementations, the functions denoted by the blocks may occur in a sequence different from the sequences shown in the figures. For example, any two blocks presented in succession may be executed, substantially in parallel, or they may sometimes be in a reverse sequence, depending on the function involved. It should also be noted that each block in the block diagrams and/or flow charts as well as a combination of blocks may be implemented using a dedicated hardware-based system executing specified functions or operations, or by a combination of a dedicated hardware and computer instructions.

The units involved in the embodiments of the present disclosure may be implemented by means of software or hardware. The described units may also be provided in a processor, for example, described as: a processor, comprising a loading unit, a first determining unit, a second determining unit, and a migrating unit, where the names of these units do not in some cases constitute a limitation to such units themselves. For example, the loading unit may also be described as "a unit for loading a target kernel module of a target operating system."

In another aspect, some embodiments of the present disclosure further provide a computer-readable storage medium. The computer-readable storage medium may be the computer storage medium included in the electronic device in the above described embodiments, or a stand-alone computer-readable storage medium not assembled into the electronic device. The computer-readable storage medium stores one or more programs. The one or more programs, when executed by an electronic device, cause the electronic device to: loading a target kernel module of a target operating system, the target operating system used for controlling a target electronic device running the virtual machine, and the target kernel module used for performing a shutdown operation for the target electronic device; determining whether to perform the shutdown operation based on electronic device running state information of the target electronic device; determining whether to migrate the virtual machine when a preset triggering condition is met, in response to determining not to perform the shutdown operation; and migrating the virtual machine, in response to determining to migrate the virtual machine.

The above description only provides an explanation of the preferred embodiments of the present disclosure and the technical principles used. It should be appreciated by those skilled in the art that the inventive scope of the present disclosure is not limited to the technical solutions formed by the particular combinations of the above-described technical features. The inventive scope should also cover other technical solutions formed by any combinations of the above-described technical features or equivalent features thereof without departing from the concept of the disclosure. Technical schemes formed by the above-described features being interchanged with, but not limited to, technical features with similar functions disclosed in the present disclosure are examples.

What is claimed is:

1. A method for migrating a virtual machine, comprising:
    loading a target kernel module of a target operating system, the target operating system used for controlling a target electronic device running the virtual machine, and the target kernel module used for performing a shutdown operation for the target electronic device;
    determining whether to perform the shutdown operation based on electronic device running state information of the target electronic device;
    determining whether to migrate the virtual machine in response to determining that a preset triggering condition is met, in response to determining not to perform the shutdown operation; and
    migrating the virtual machine in response to determining to migrate the virtual machine,
    wherein the loading a target kernel module of a target operating system comprises:
        detecting whether a predefined abnormal event occurs in a kernel of the target operating system; and
        loading the target kernel module, in response to detecting the predefined abnormal event occurring;
    wherein the preset triggering condition is an identifier matching an abnormal event identifier of the predefined abnormal event existing in a preset identifier set;
    wherein the method is performed by at least one processor.

2. The method according to claim 1, wherein the target electronic device comprises at least two processors, the electronic device running state information comprises an abnormal processor ratio, and the abnormal processor ratio is a ratio of a number of processors involved in the predefined abnormal event to a total number of processors in the target electronic device; and
the determining whether to perform the shutdown operation based on electronic device running state information of the target electronic device comprises:
    determining whether the abnormal processor ratio is greater than a preset ratio threshold; and
    determining to perform the shutdown operation, in response to determining the abnormal processor ratio being greater than the preset ratio threshold.

3. The method according to claim 1, wherein the determining whether to migrate the virtual machine comprises:
    determining whether a processor running the virtual machine is a processor involved in the predefined abnormal event; and
    determining not to migrate the virtual machine, in response to determining the processor running the virtual machine being the processor involved in the predefined abnormal event.

4. The method according to claim 3, wherein the determining whether to migrate the virtual machine further comprises:
    performing an operation prior to migration to reduce difficulty in migrating the virtual machine, in response to determining the processor running the virtual machine being not the processor involved in the predefined abnormal event.

5. The method according to claim 4, wherein the operation prior to the migration comprises at least one of: adjusting a scheduling priority of the virtual machine, or modifying information of affinity between the virtual machine and the processor running the virtual machine.

6. The method according to claim 5, wherein the determining whether to migrate the virtual machine further comprises:
    determining whether to migrate the virtual machine based on the running state information of the virtual machine after performing the operation prior to the migration.

7. The method according to claim 1, wherein after the migrating the virtual machine, the method further comprises:
    generating a migration result, in response to determining the migrating the virtual machine being completed.

8. The method according to claim 7, wherein the determining whether to migrate the virtual machine comprises:
    concurrently performing the determining whether to migrate the virtual machine and a wait operation, wherein the wait operation comprises: defining time of determining not to perform the shutdown operation as start time; determining whether a wait duration between current time and the start time is greater than a preset duration threshold; and performing the shutdown operation, in response to determining the wait duration being greater than the preset duration threshold.

9. The method according to claim 8, wherein the wait operation further comprises:
    defining the start time as initial triggering time, in response to determining the wait duration being smaller than or equal to the preset duration threshold, and performing following determination: determining whether the migration result is generated at the triggering time; and performing the shutdown operation, in response to determining the migration result being generated; and
    updating the triggering time using a sum of the triggering time and a first preset duration in response to determining the migration result being not generated, and continuing performing the determination.

10. The method according to claim 9, wherein a first kernel module, a second kernel module and a user state process communicate with each other through a shared memory, wherein the first kernel module is used for performing the determining whether to perform the shutdown operation based on electronic device running state information of the target electronic device; the second kernel module is used for performing the determining whether to migrate the virtual machine in response to determining that a preset triggering condition is met, in response to determining not to perform the shutdown operation; and the user state process is used for performing the migrating the virtual machine.

11. An apparatus for migrating a virtual machine, comprising:
at least one processor; and
a memory storing instructions, the instructions when executed by the at least one processor, cause the at least one processor to perform operations, the operations comprising:
loading a target kernel module of a target operating system, the target operating system used for controlling a target electronic device running the virtual machine, and the target kernel module used for performing a shutdown operation for the target electronic device;
determining whether to perform the shutdown operation based on electronic device running state information of the target electronic device;
determining whether to migrate the virtual machine in response to determining that a preset triggering condition is met, in response to determining not to perform the shutdown operation; and
migrating the virtual machine, in response to determining to migrate the virtual machine; wherein the loading a target kernel module of a target operating system comprises:
detecting whether a predefined abnormal event occurs in a kernel of the target operating system; and
loading the target kernel module, in response to detecting the predefined abnormal event occurring;
wherein the preset triggering condition is an identifier matching an abnormal event identifier of the predefined abnormal event existing in a preset identifier set.

12. The apparatus according to claim 11, wherein the target electronic device comprises at least two processors, the electronic device running state information comprises an abnormal processor ratio, and the abnormal processor ratio is a ratio of a number of processors involved in the predefined abnormal event to a total number of processors in the target electronic device; and
the determining whether to perform the shutdown operation based on electronic device running state information of the target electronic device comprises:
determining whether the abnormal processor ratio is greater than a preset ratio threshold; and
determining to perform the shutdown operation, in response to determining the abnormal processor ratio being greater than the preset ratio threshold.

13. The apparatus according to claim 11, wherein the determining whether to migrate the virtual machine comprises:
determining whether a processor running the virtual machine is a processor involved in the predefined abnormal event; and
determining not to migrate the virtual machine, in response to determining the processor running the virtual machine being the processor involved in the predefined abnormal event.

14. The apparatus according to claim 13, wherein the determining whether to migrate the virtual machine further comprises:
performing an operation prior to migration to reduce difficulty in migrating the virtual machine, in response to determining the processor running the virtual machine being not the processor involved in the predefined abnormal event.

15. The apparatus according to claim 14, wherein the operation prior to the migration comprises at least one of: adjusting a scheduling priority of the virtual machine, or modifying information of affinity between the virtual machine and the processor running the virtual machine.

16. A non-transitory computer storage medium storing a computer program, the computer program when executed by one or more processors, causes the one or more processors to perform operations, the operations comprising:
loading a target kernel module of a target operating system, the target operating system used for controlling a target electronic device running the virtual machine, and the target kernel module used for performing a shutdown operation for the target electronic device;
determining whether to perform the shutdown operation based on electronic device running state information of the target electronic device;
determining whether to migrate the virtual machine in response to determining that a preset triggering condition is met, in response to determining not to perform the shutdown operation; and
migrating the virtual machine in response to determining to migrate the virtual machine;
wherein the loading a target kernel module of a target operating system comprises:
detecting whether a predefined abnormal event occurs in a kernel of the target operating system; and
loading the target kernel module, in response to detecting the predefined abnormal event occurring;
wherein the preset triggering condition is an identifier matching an abnormal event identifier of the predefined abnormal event existing in a preset identifier set.

* * * * *